Dec. 8, 1925.

O. LARSEN

ICE CREAM FREEZER

Filed Oct. 23, 1922

1,564,253

3 Sheets-Sheet 1

Inventor
Olaf Larsen
by Hewitt & Dixon
Atty

Dec. 8, 1925.  1,564,253
O. LARSEN
ICE CREAM FREEZER
Filed Oct. 23, 1922   3 Sheets-Sheet 2

Inventor
Olaf Larsen

Dec. 8, 1925. 1,564,253
O. LARSEN
ICE CREAM FREEZER
Filed Oct. 23, 1922 3 Sheets-Sheet 3
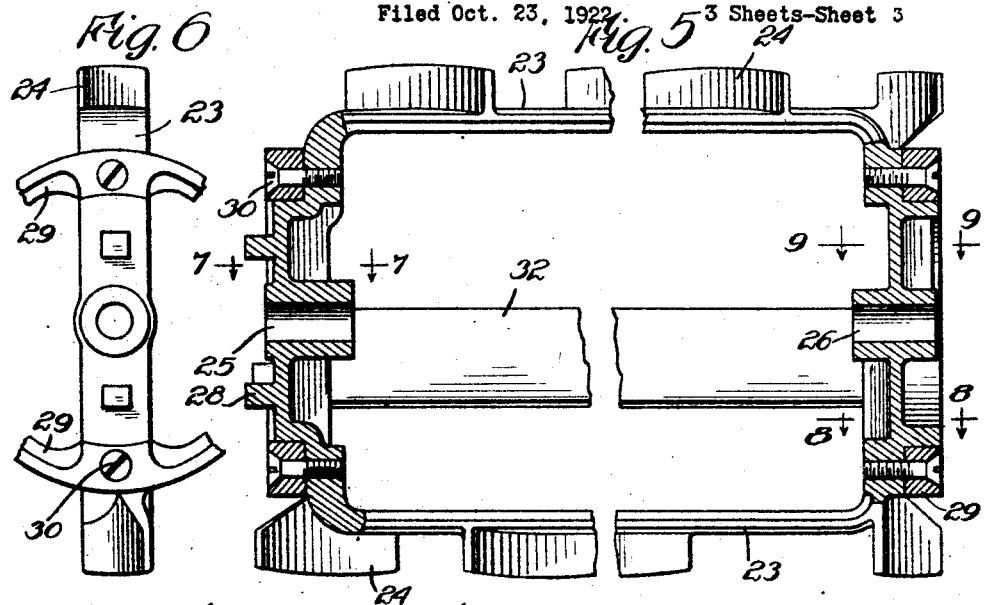
  
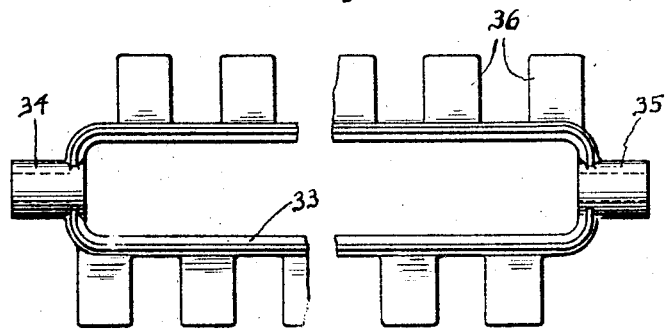
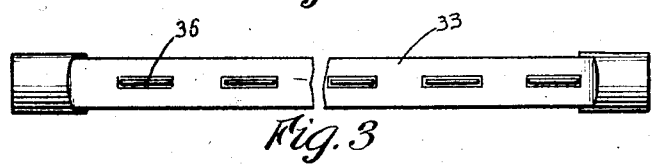
Inventor
Olaf Larsen Patented Dec. 8, 1925.

1,564,253

UNITED STATES PATENT OFFICE.

OLAF LARSEN, OF FORT ATKINSON, WISCONSIN, ASSIGNOR TO THE CREAMERY PACKAGE MFG. COMPANY, OF CHICAGO, ILLINOIS, A CORPORATION OF ILLINOIS.

ICE-CREAM FREEZER.

Application filed October 23, 1922. Serial No. 596,261.

*To all whom it may concern:*

Be it known that I, OLAF LARSEN, a citizen of the United States, residing at Fort Atkinson, in the county of Jefferson and the State of Wisconsin, have invented certain new and useful Improvements in Ice-Cream Freezers, of which the following is a specification.

The invention relates to ice cream freezers, and more particularly to the agitating means employed therein.

The usual construction of an ice cream freezer includes revolving agitators or dashers operating within a refrigerated cylindrical container, the agitators more frequently comprising a pair of dashers oppositely rotating about a common axis.

An important operative function of the agitating elements is to effect a circulatory movement of the liquid mixture of ice cream material to and from the chilled walls of the cylinder in such manner as to accomplish during the operation a thorough intermixture of the entire body of material and a uniform lowering of temperature throughout the mixture. Another important function of the agitating elements is to whip the congealing material into a finely divided cellular product of uniformly smooth texture and uniform increase in volume.

It is the object of this invention to provide a construction of agitating elements which accomplishes the functional results mentioned within a minimum of operating time and with superior effectiveness.

Other objects and advantages will be apparent in the following description of a preferred embodiment of my invention, which I have selected for illustration in the accompanying drawings.

Figure 1:
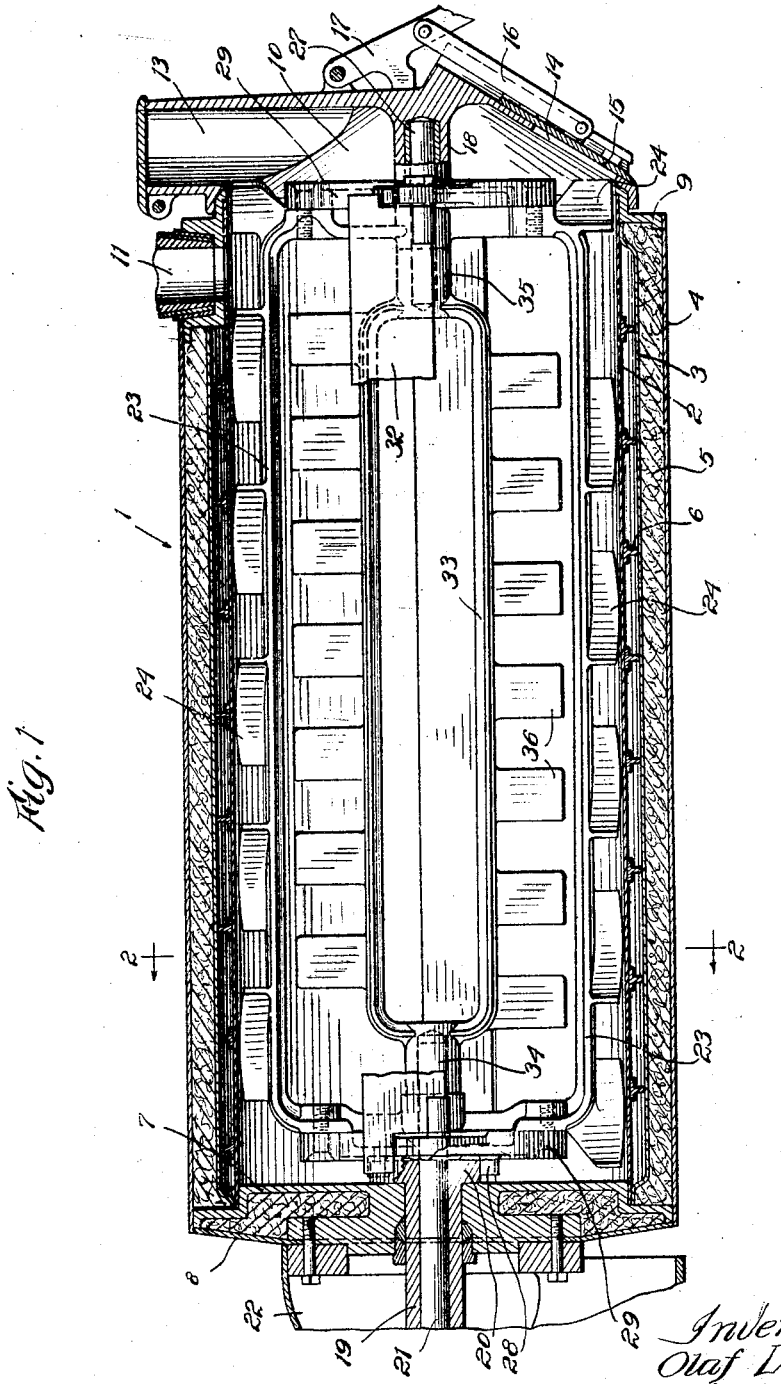
Figure 2:
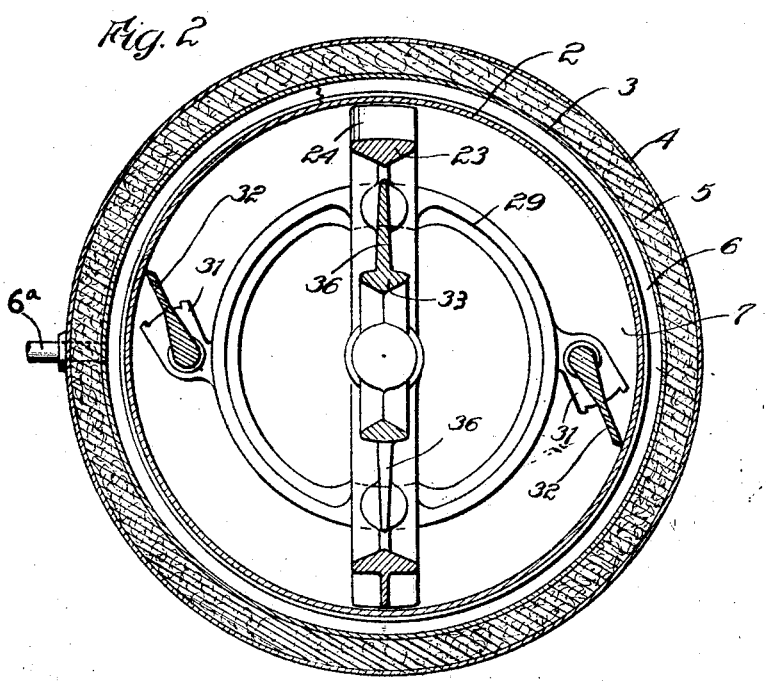

In the drawings; Figure 1 represents a longitudinal section of a freezing cylinder showing the agitating elements in side elevation; Figure 2 is a cross sectional view of the cylinder and agitating elements taken on the plane of the line 2—2 in Figure 1; Figure 3 is a fragmentary top view of the inner agitating element; Figure 4 is a fragmentary side view of the inner agitating element; Figures 5 and 6 are fragmentary side and end views respectively of the outer agitating element; Figures 7, 8 and 9 are sectional views taken on the planes of lines 7—7, 8—8 and 9—9 respectively in Figure 5.

In the embodiment of my invention herein illustrated, a cylindrical freezing drum 1 is constructed with three concentric spaced shells or cylinders 2, 3 and 4, the inner space between shells 2 and 3 being provided for the circulation of a cooling medium such as cold brine, and that between shells 3 and 4 for the introduction of insulating material 5 to prevent the absorption by the brine of heat from the outside. The brine circulation space is preferably constructed with partition members 6 secured in spiral formation about the inner cylinder 2 and extending into contact with the intermediate cylinder 3, forming thereby a circuitous passage for the brine about the inner freezing chamber. The end portions of the cylinder 3 may be turned into contact with the inner cylinder 2 and joined thereto to seal the brine space. A suitable brine inlet 6ª and brine outlet (not shown) are connected with the respective ends of the brine passage.

The rear end of the drum 1 preferably is permanently closed by an end wall 7 of appropriate construction for sealing thereto the ends of the drum cylinders and for providing a rear bearing support for the agitating elements. A spaced outer end jacket 8 provides an enclosed chamber for the reception of insulating material. The front end of the drum is provided with a suitable collar 9 to which are sealed the front ends of the drum cylinders, and which is formed with an extended annular flange for the support of a removable front end closure, or cover 10. An inlet 11 positioned in the upper side of the drum communicates with the interior of the latter for the introduction of the liquid ingredients to be frozen.

The removable cover 10 may be secured in position on the collar 9 by any suitable means permitting ready detachment. The cover 10 is preferably constructed with an upright tubular extension 13 opening through the upper portion of the cover and providing an air vent for the interior of the freezer. In the lower portion of the cover there is provided a discharge outlet 14 operatively closed by a sliding gate 15 supported in suitable slide ways and controlled through the link 16 by the handle 17 pivoted on the cover structure. A centrally positioned boss 18 on the inner side of the cover provides a front bearing for the rotative agitating elements.

The agitating elements comprise a pair of dashers independently rotating within the freezer drum, preferably operable in opposite directions about a common axis. The driving means therefor comprises a tubular shaft 19 journalled in the outwardly extended center portion of the end wall 7 and preferably provided at its inner end with a flange 20 having radial slots for the removable engagement of clutch members on one of the dashers. Operatively positioned within the tubular shaft 19 is a second shaft 21 extending therethrough for driving engagement with the other of the dashers. Suitable means for the transmission of power to the two shafts may be located rearwardly of the drum and preferably housed as in a casing of which a fragmentary portion is represented at 22.

The outer dasher of the pair of agitating elements comprises a substantially rectangular frame 23 (see Figs. 1 and 5) on the side members of which are formed spaced radially projecting blades 24, those on one side preferably arranged in staggered relation to those on the opposite side, and omitted from those portions of the frame which traverse the mouth of the inlet 11 to avoid splashing of the material therethrough. The blades 24 are pitched in angular relation to the longitudinal axis of the dasher and extend in proximity to the chilled inner cylinder 2 so that in operation their effect is to move the congealing material longitudinally and assist in the discharge of the freezer when the gate 15 is opened.

The end members of the frame 23 are provided with centrally positioned bearings 25 and 26, the rear end bearing 25 being operatively supported on the shaft 21 extending therethrough, and the front bearing 26 being supported on the intermediate portion of a stub shaft 27 which carries the inner dasher element and is journaled in the boss 18 on the front cover. The rear end member of the frame 23 is provided also with lugs 28 adapted to engage the radial slots in the driving flange 20 of the tubular shaft 19. Both end members are constructed to assist in the circulatory movement of the material as by the angular arrangement shown in Figs. 7, 8 and 9.

At each end of the frame 23 there is provided a separable support 29 rigidly secured to the end members of the frame as by screws 30. The supports are preferably annular in form and positioned concentric to the axis of the dasher. Each of the supports 29 carries a pair of oppositely positioned lugs 31 providing pivotal end bearings for a pair of longitudinally arranged scraper blades 32. The blades 32 revolve with the dasher frame 23 and maintain an angular scraping contact with the surface of the inner cylinder 2, their effect being to remove the frozen material from the refrigerated cylinder and direct it inwardly into the body of the mixture.

The other agitating element or inner dasher comprises also a substantially rectangular frame 33 having end hub extensions 34 and 35 axially alined with and operatively abutting the respective end bearings 25 and 26 of the outer dasher. The inner end of the shaft 21 is secured in driving connection within the hub 34, and the stub shaft 27 is likewise secured in the hub 35. Formed on the side members of the inner dasher frame 33 are series of spaced radially projecting agitating blades 36, the opposite series preferably arranged in staggered relation. The blades 36 preferably have substantially flat surfaces parallel to the axis of rotation of the dasher, and extend proximately to the side members of the outer dasher frame 23.

In their operation upon the liquid material admitted to the drum for freezing, the agitating elements herein described give maximum effectiveness in accomplishing a constant and complete movement of all parts of the body of material into recurrent contact with the refrigerated wall of the cylinder.

It appears in practice that the rapidly revolving outer dasher propels the liquid material in a rotary movement which is further influenced by the centrifugal action created by such movement, so that the body of material tends to assume annular form about the wall of the confining cylinder and to develop an axial space void of material. In such circumstance it will be obvious that centrally positioned blades mounted on an axial shaft will be ineffective to agitate the mixture for a considerable portion of their radial length.

It further appears that such an axial shaft and the bases of the blades mounted thereon tend to accumulate quantities of partially frozen material passing through the axial space, which material, due to the slight centrifugal force generated in their radially short path of movement, adheres to the shaft and the blades without further agitation, thereby producing in the finished product an uneven texture and a varied volumetric increase.

The widely spaced blade-carrying side members of the inner dasher frame herein disclosed avoids a center shaft with its apparent tendency to accumulate a clinging mass of unagitated material. The successive passage of the inner frame members through their radially wide path of revolution effects constant movement of the inner portion of the body of material.

The series of flat blades carried by the inner dasher frame members travel counterwise to the rotary current produced in the material by the outer dasher, and accomplish a highly effective agitation or whipping effect in their passage through the material. As the outer portion of the material is scraped from the chilled cylinder wall and directed inwardly over the angularly positioned surfaces of the scraper blades, it is smartly struck by the reversely passing flat blades of the inner dasher and thoroughly intermixed with the inner portion of material. Centrifugal action again carries the intermixed mass outwardly into the path of the outer dasher blades 24 which shift it longitudinally preliminary to its being again moved inwardly by the scraper blades.

Further intermixture of the material is accomplished by the longitudinal movement of the outer portion of the mass by the blades 24, which being confined within the cylinder necessarily induces opposite longitudinal movement of the inner portion of the mass through the path of the inner dasher blades.

It will now be apparent that I have provided a simple effective construction for the thorough, uniform and rapid agitation of the entire mass of material, thereby accomplishing in maximum degree the desired result of an evenly frozen product having the qualities of smooth texture and uniform "yield" attained in the minimum of operating time.

I claim as my invention:

1. In a device of the class described, material agitating means comprising an inner dasher having a substantially rectangular rigid frame structure inclosing an unobstructed central space, outwardly extending radial blades formed on the side members of said frame structure, endwardly extending shafts mounted on the end members of said frame structure, an outer dasher of substantially rectangular rigid frame structure enclosing a space arranged to receive said inner dasher, bearings in the end members of said outer dasher adapted to operatively receive said shafts, and radial blades formed on the side members of said outer dasher.

2. In a device of the class described, material agitating means comprising an inner dasher having a substantially rectangular rigid frame structure enclosing an unobstructed central space, outwardly extending alined shafts mounted on the end members of said frame structure, radial blades formed on the side members of said frame structure having substantially flat surfaces disposed in parallel relation to the axis of said shafts, an outer dasher of substantially rectangular rigid frame structure enclosing a space arranged to receive said inner dasher, bearings in the end members for said shafts, and radial blades formed on the side members of said outer dasher pitched in angular relation to the axis of said shafts, portions of the end members of said outer dasher being formed with an angular pitch opposed to the pitch of said last mentioned blades.

3. In a device of the class described, agitating means comprising an inner dasher having a substantially rectangular frame structure enclosing an open central space, a series of outwardly extending flat radial blades mounted on the side members of said inner dasher frame in parallel arrangement to the longitudinal axis of said frame, a shaft mounted on each end member of said frame, an outer dasher of substantially rectangular frame structure having an open central space adapted to operatively receive said inner dasher, bearings for said shafts in the respective end members of said outer dasher frame, and outwardly extending radial blades mounted on the side members of said outer dasher frame.

In witness whereof I have hereunto set my hand.

OLAF LARSEN.